Oct. 2, 1951 U. L. G. BALDÉ 2,569,879
FLEXIBLE CONNECTION BOX FOR TABULATORS
Filed Sept. 24, 1947 11 Sheets-Sheet 1

Inventor
U. L. G. Balde

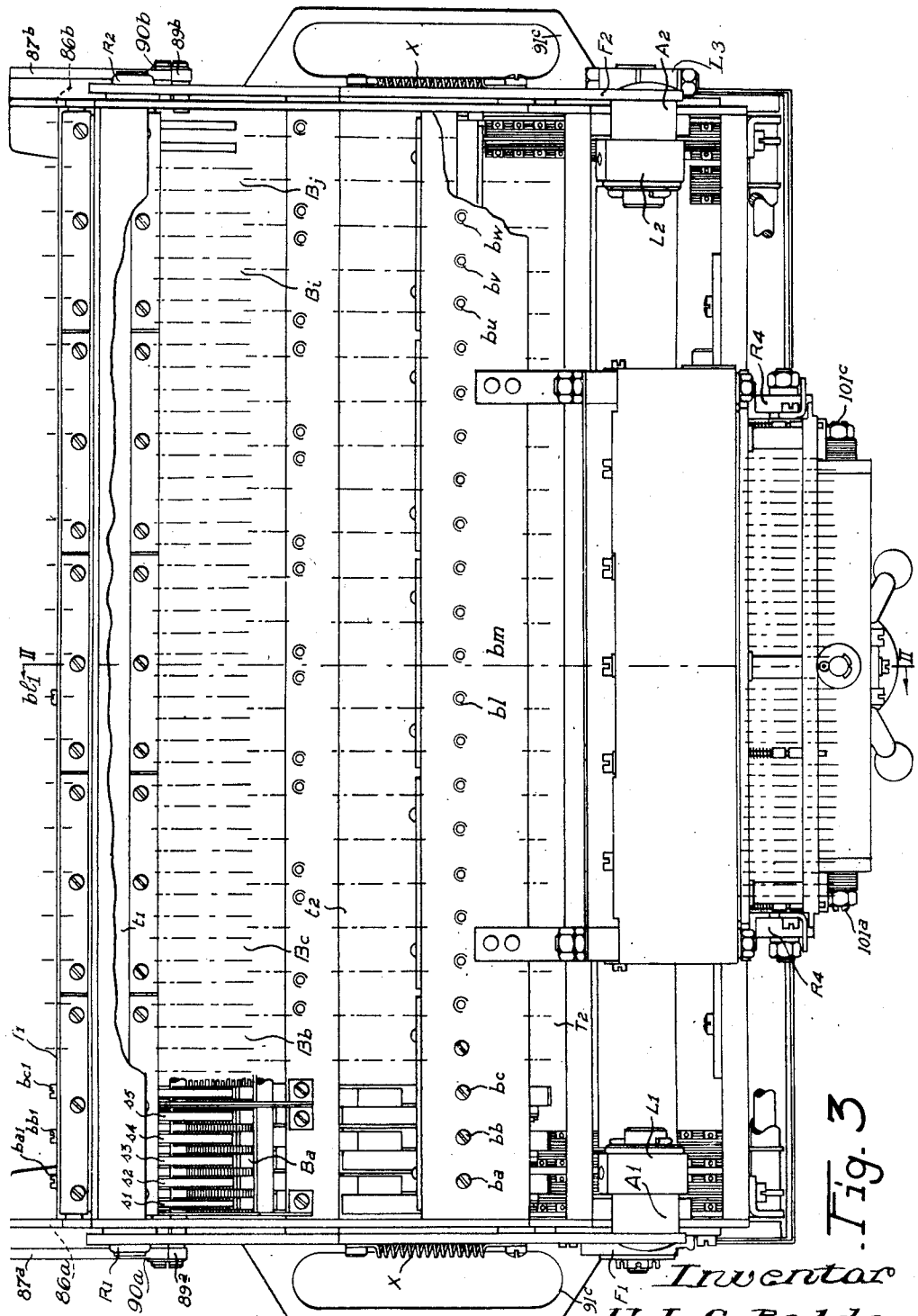

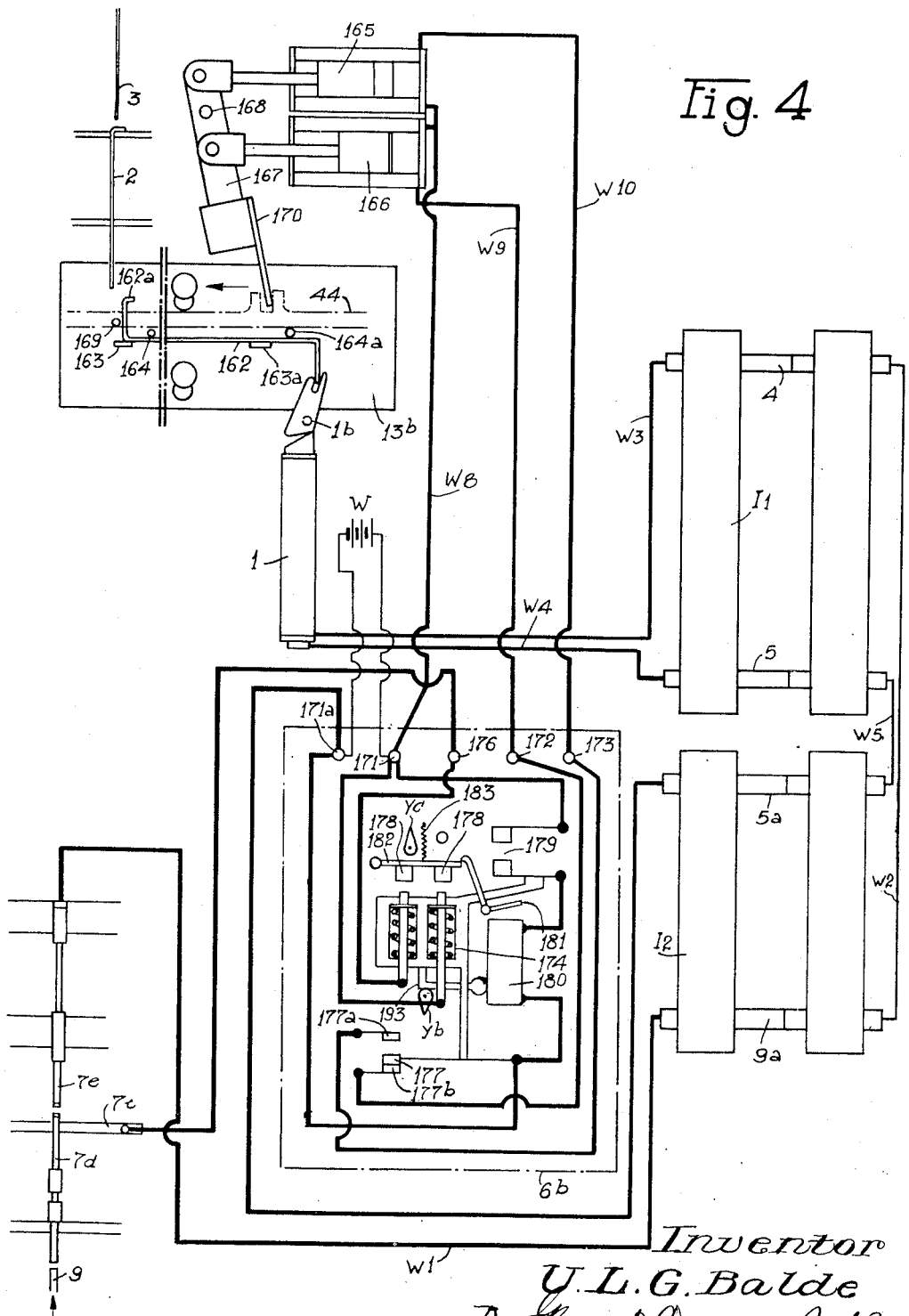

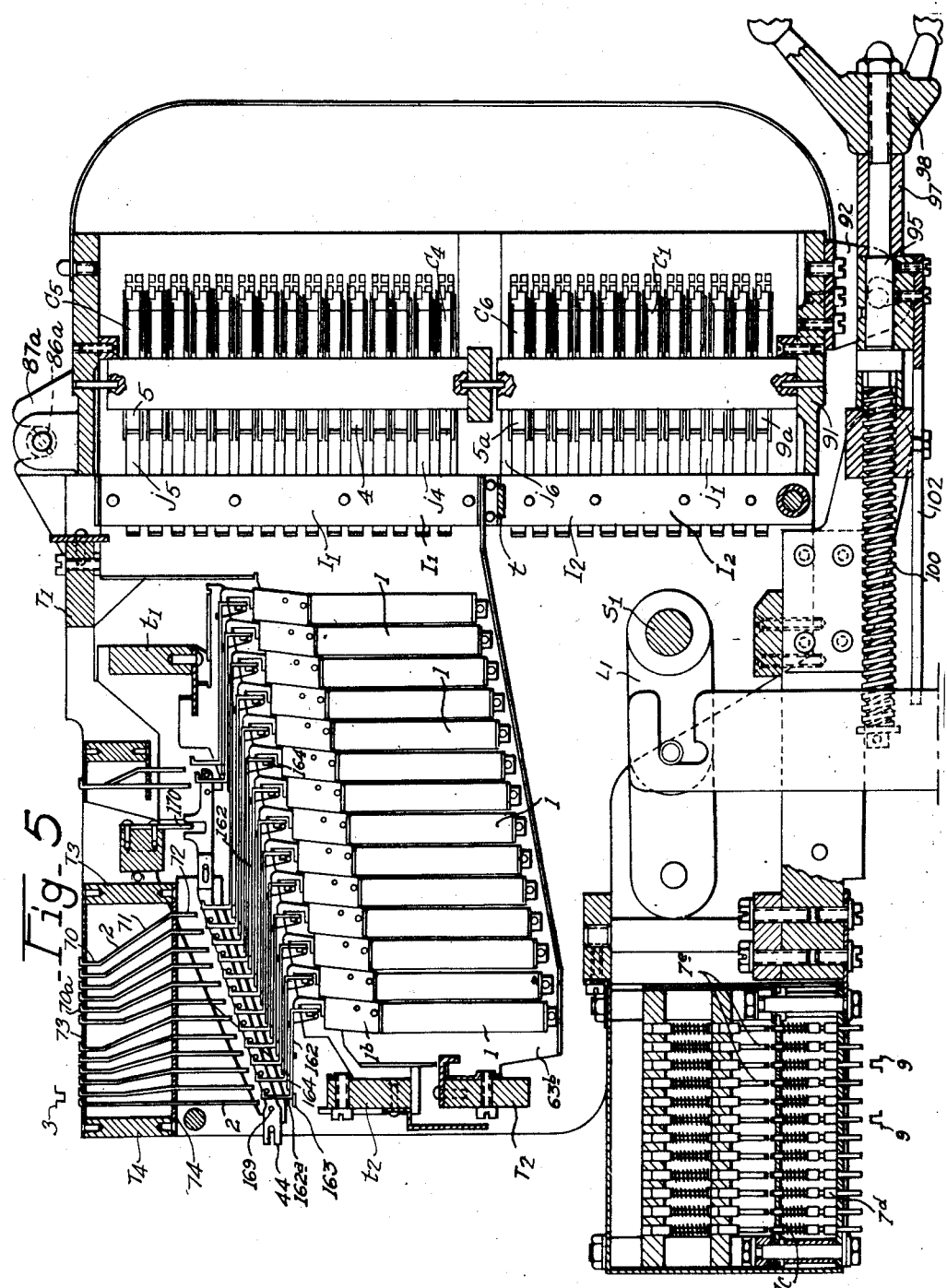

Oct. 2, 1951  U. L. G. BALDÉ  2,569,879
FLEXIBLE CONNECTION BOX FOR TABULATORS
Filed Sept. 24, 1947  11 Sheets-Sheet 6
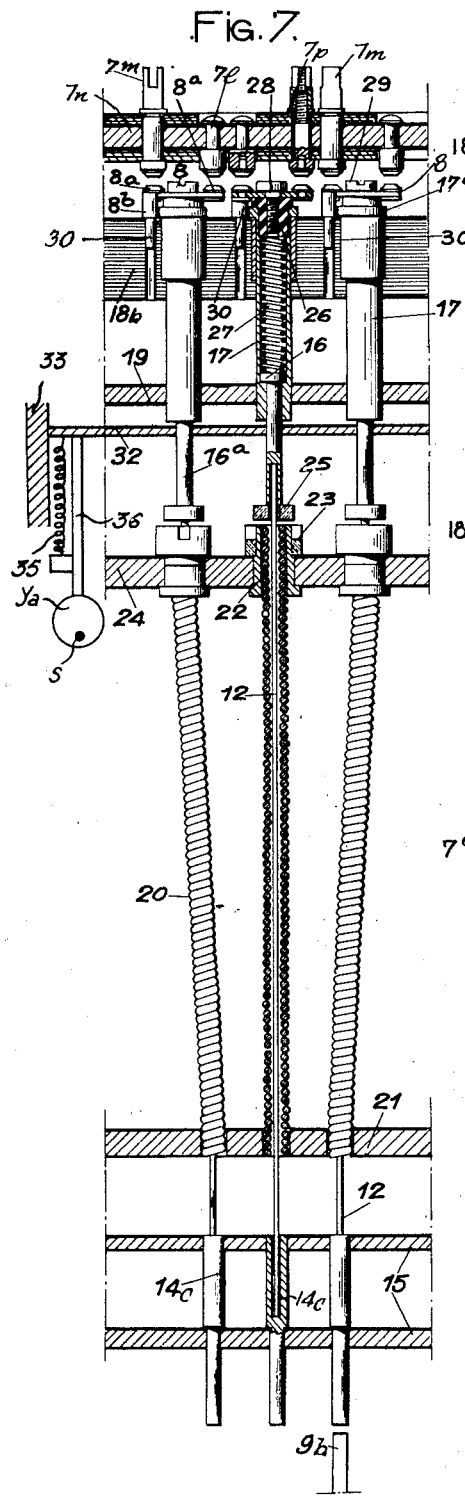
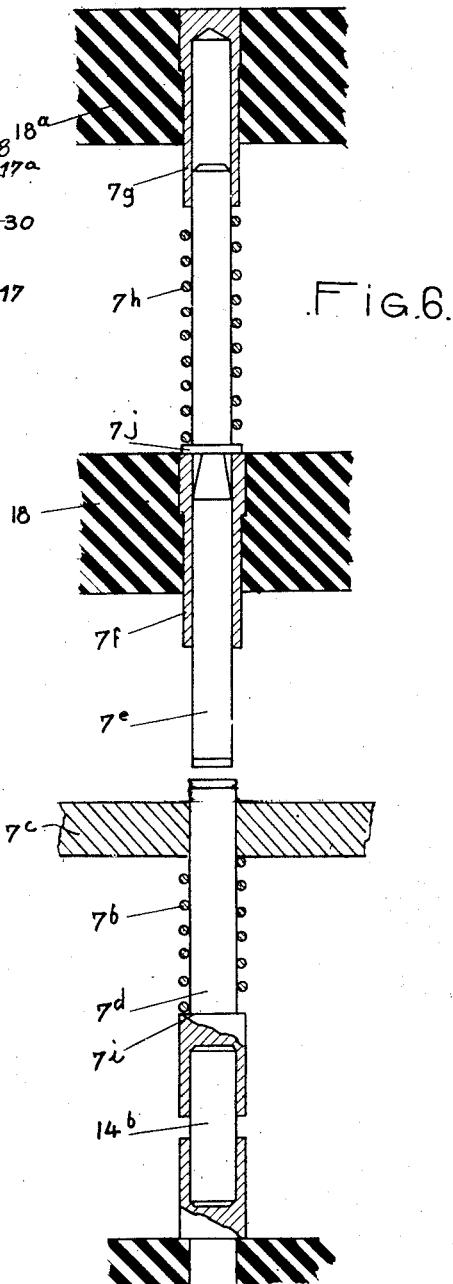
Inventor
U. L. G. Balde

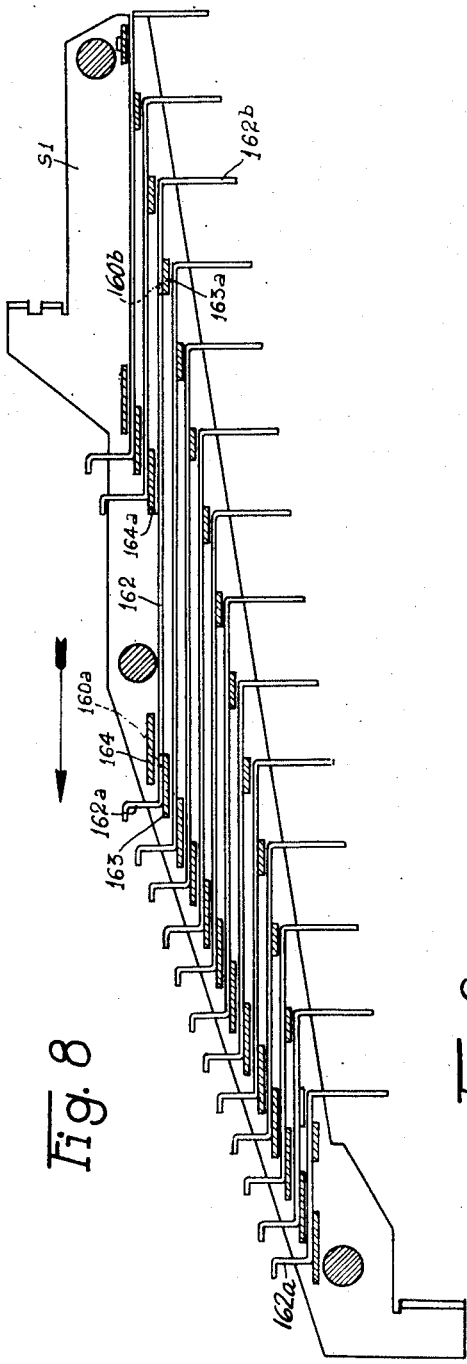
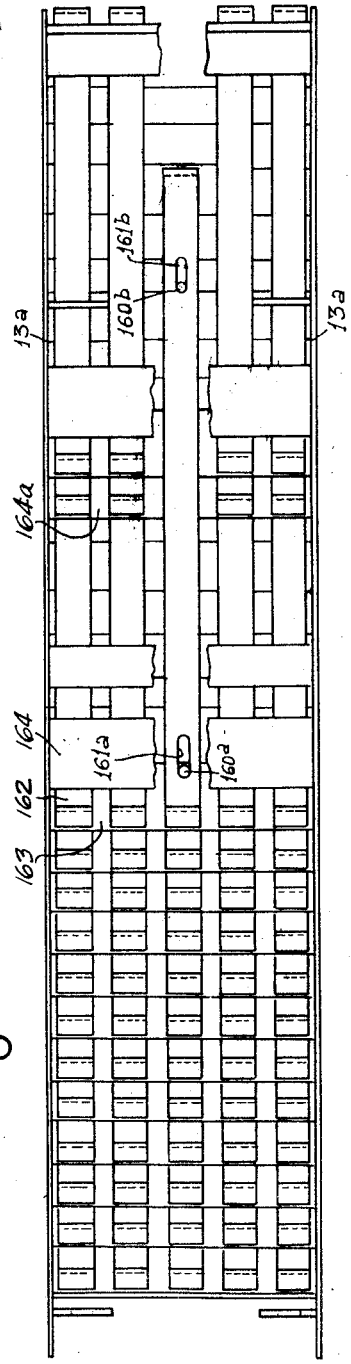

Oct. 2, 1951     U. L. G. BALDÉ     2,569,879
FLEXIBLE CONNECTION BOX FOR TABULATORS
Filed Sept. 24, 1947     11 Sheets-Sheet 8
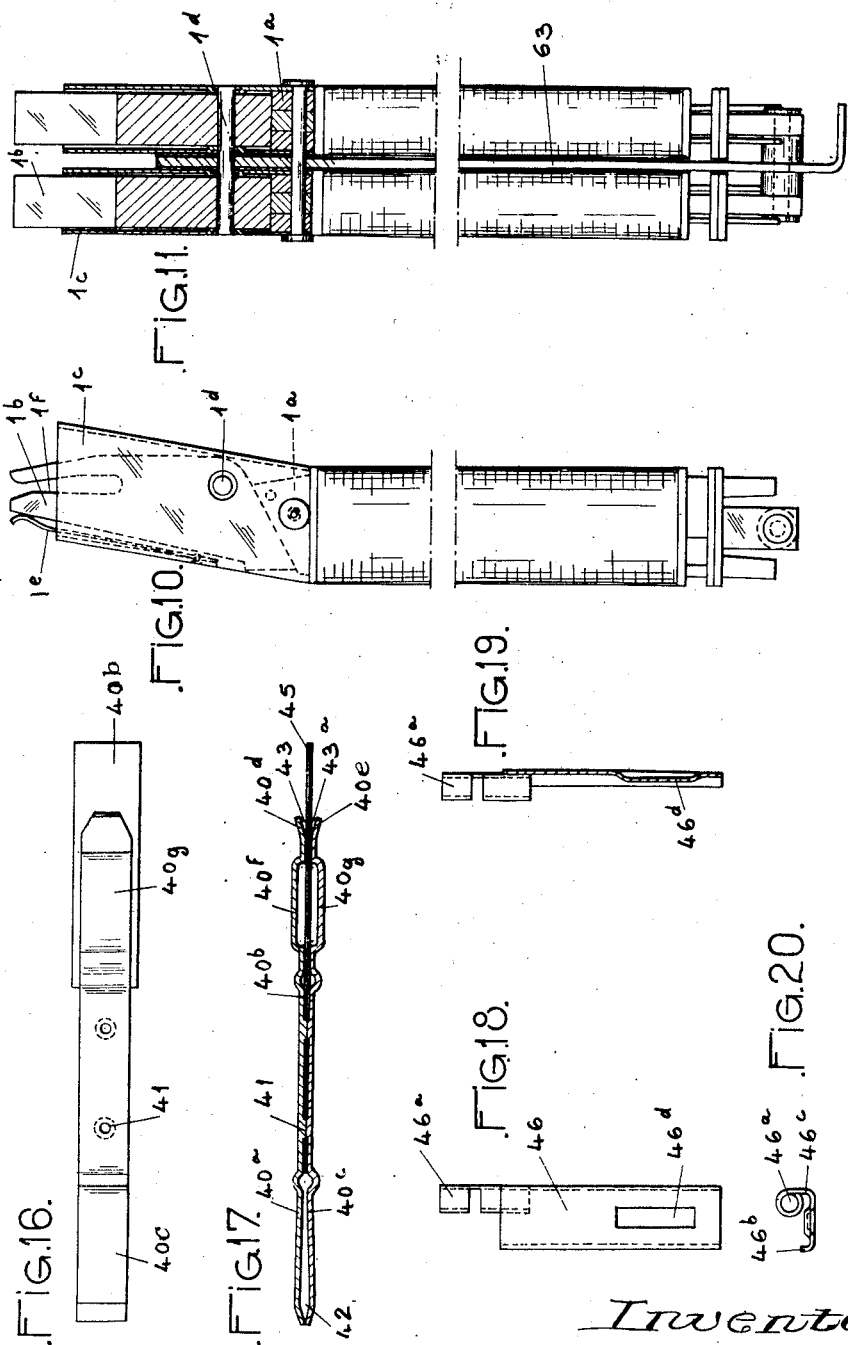
Inventor
U. L. G. Baldé

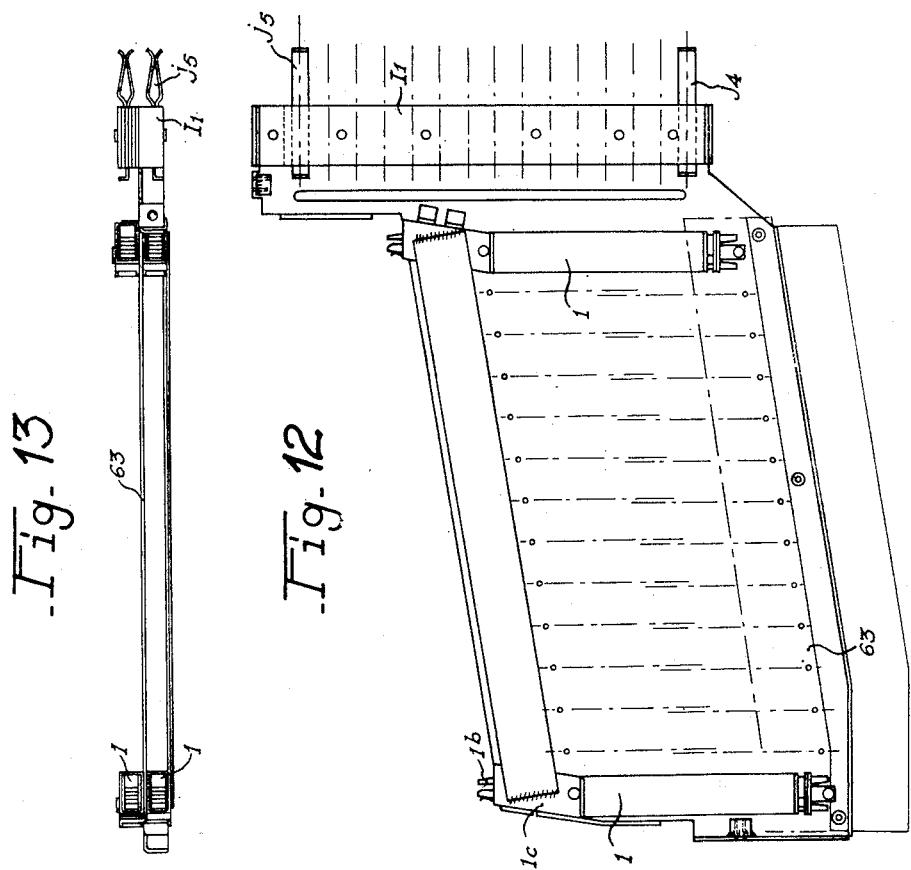

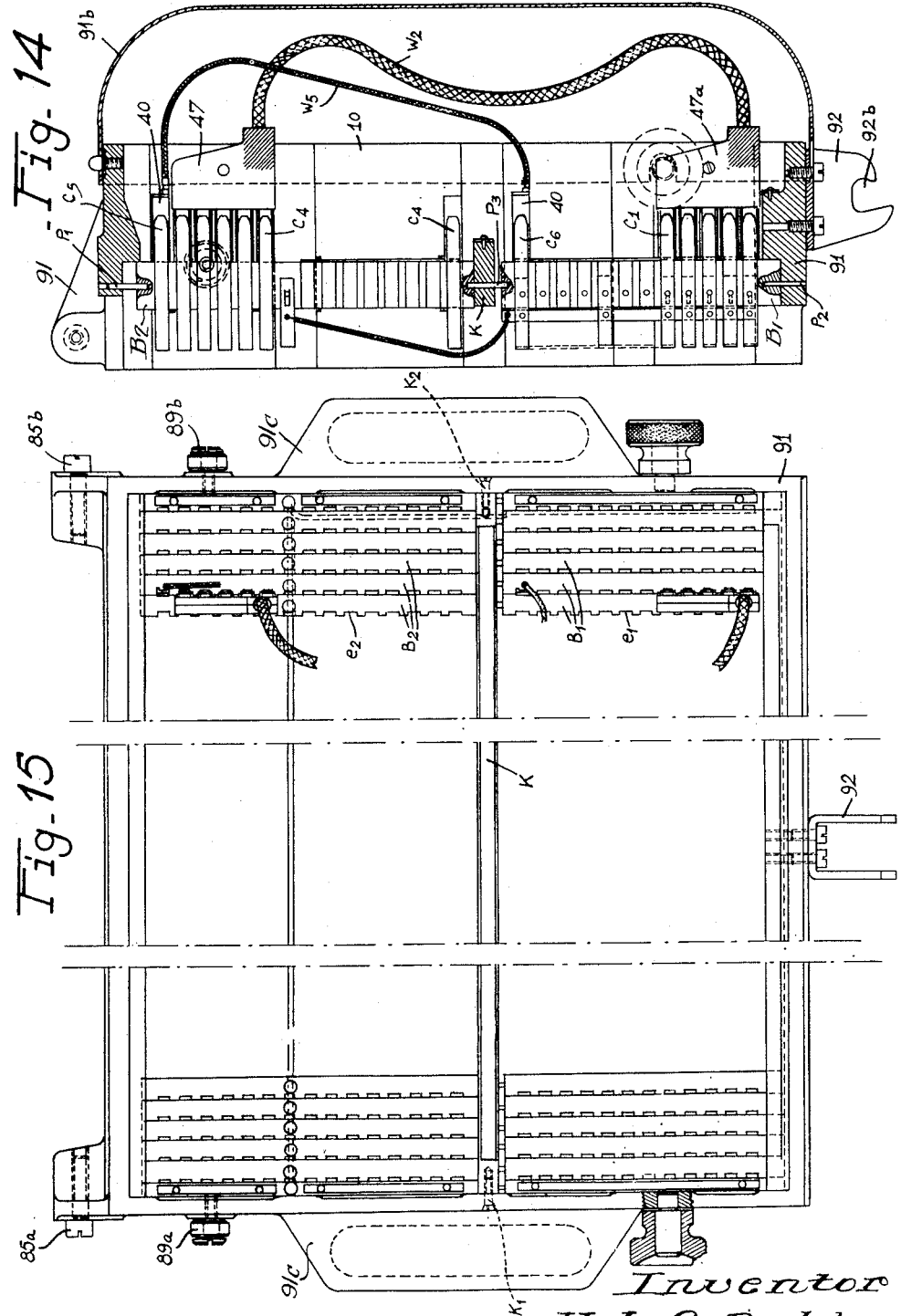

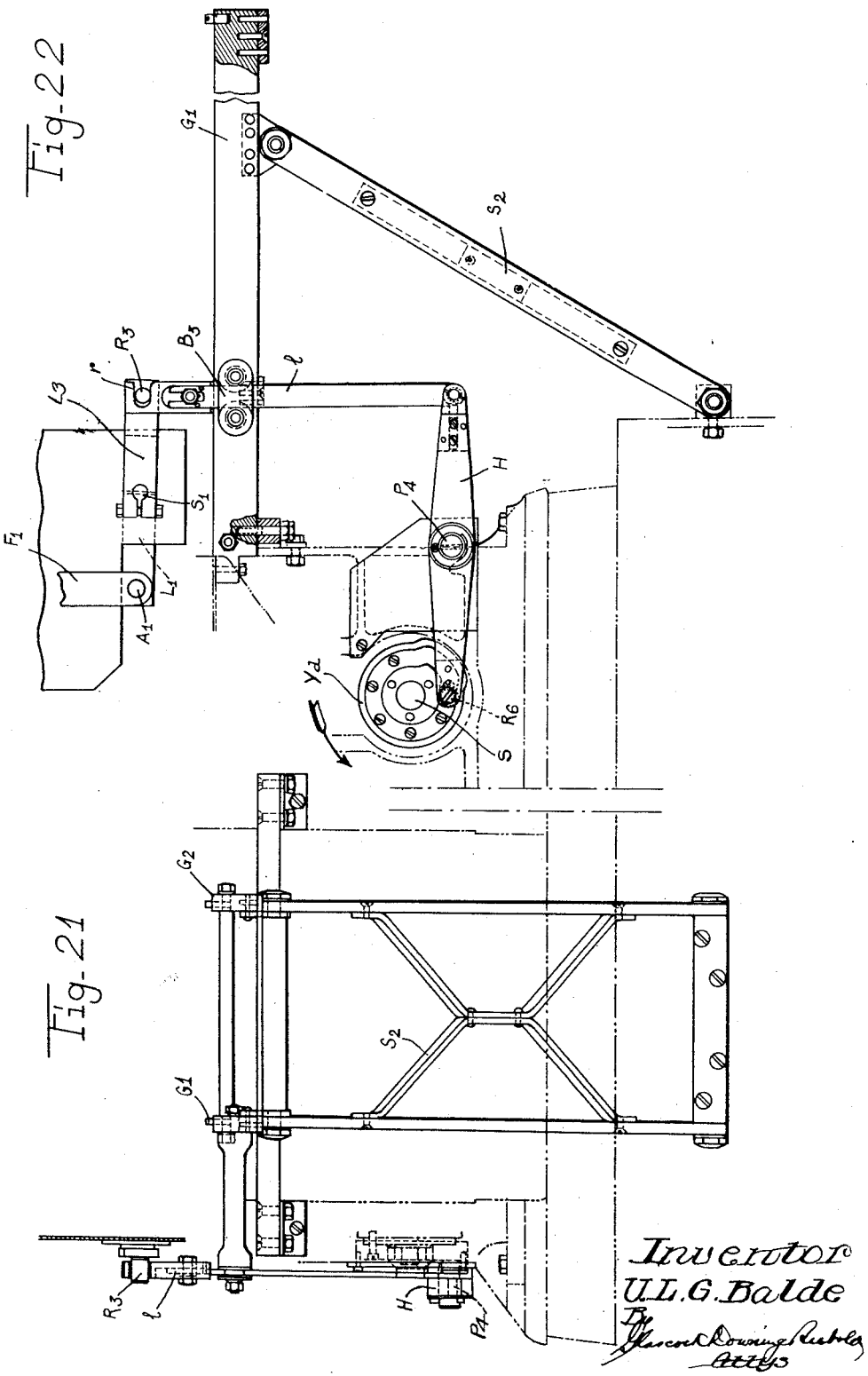

Patented Oct. 2, 1951

2,569,879

UNITED STATES PATENT OFFICE 2,569,879

FLEXIBLE CONNECTION BOX FOR TABULATORS

Ulysse Louis Gabriel Baldé, Paris, France, assignor to Société Anonyme: Compagnie Industrielle de Machines Automatiques de Comptabilite, Paris, France Application September 24, 1947, Serial No. 775,910
In France July 24, 1943

Section 1, Public Law 690, August 8, 1946
Patent expires July 24, 1963

13 Claims. (Cl. 235—61.6)

This patent application is a continuation in part of my earlier patent application Serial No. 679,848, filed on June 27, 1946, now abandoned, for "Flexible Connection Box for Card Perforating Machines of the Type Called Tabulating Machines," and certain parts of the present application will be found in the earlier application.

The present invention relates to an improved connection box called "flexible connection box" adapted for use in perforated card controlled machines or "tabulating machines" as used in particular for automatic statistical operations and wherein the record sensing is effected by means of a needle-block or pin-box having a number of needles, the number and distribution of which are identical to those of all the possible perforations which may exist in the surface of a card. The perforated cards are successively fed under the needle-unit or "pin-box" which is moved in such a way that the needles positioned in registry with perforations in the card pass through the card, the others being retained by the latter. The sensing of the analysed card is represented by the bunch of needles which have traversed it.

The sensing of the card is transmitted to the printing, registering and other mechanisms under the control of members called "sectors" the angular positioning of which is determined by "stops" each controlled by the raising of a needle and forming the stop-basket. The connection box in tabulators serves the function of providing a mechanical connection between the needles of the pin-box and the stops of the stop-basket. The connection boxes known in prior art comprise a frame wherein are slidably mounted rigid wires one end of which is engaged by a needle while the other acts upon a stop. According to the character of the work to be performed, the rigid wires are formed in such a way that a predetermined needle raises a likewise predetermined stop.

Such rigid wire boxes wherein the main advantages are simplicity and reliability in operations offer various drawbacks the chiefs of which are following:

a. The maximum diameter of the rigid wire is limited by the spacing between the centre axes of the needles and also by the need for providing between adjacent wires sufficient clearance to avoid mutual actuation by friction. The stiffness of the wires is therefore limited and if it is desired to avoid their buckling, it is impossible to exceed a certain amount of offset between the ends of each wire, which means that a predetermined needle may control only certain sectors.

b. If it is desired simultaneously to connect columns located at the right hand side of a card to sectors located at the left of the machine, and columns at the left with sectors at the right, it is necessary to cross the wires which, if it is desired not to reach excessive deformation for such wires, is only possible to a limited extent.

c. In the event where more than one sector have to be connected to one and the same needle, bundles of wires are formed, which are connected at the lower end so as to register with the needle concerned and which diverge therefrom so as to connect with the various stops involved. The number of individual wires in a bundle is obviously restricted by the presence of the other wires corresponding to other needles.

d. Alterations in the rigid wire connection box, when it is desired to alter the character of the work to be performed with the tabulator, require the attention of a specialist.

With a view to remedy to the above drawbacks, this invention has for main object to provide a flexible connection box for tabulator, specially equipped for performing a work the character of which is different from the character of the normal work of the tabulator and which has been predetermined according to one of the different works which may be performed by said tabulator, said box being inserted between the stop-basket and the pin-box of the tabulator, in place of the standard rigid wire connection box, and acting by means of electrically controlled mechanical means.

Another object of the invention is to provide, in a flexible connection box of the character described, contacts operated by needles of the pin-box and interposed in energizing circuits for electromagnets each of which is operative to drivingly connect, directly or indirectly, a predetermined stop of the stop-basket with mechanical means for displacing said stop, so that said stops have their operation electrically controlled, but mechanically effected, the mechanical means, the electromagnets of which are not energized, being latched in inoperative position.

The invention has for other object to provide a flexible connection box of the character described with conducting wires, from said contacts to said magnets, which may be deformed, crossed and branch-connected in bundles without any constraint with a view to connect one or several needles of the pin-box to one or several stops of the stop-basket, whatever may be said needles and said stops.

Another object of the invention is to provide a flexible connection box of the character described with means for varying the electrical connections between contacts and magnets in accordance with the work to be performed by the tabulator.

A further object of the invention is to provide a flexible connection box of the character described with a mechanical connection between the main shaft of the tabulator and the mechanical means for displacing the stops of the stop-basket, in order to raise or to lower said mechanical means in accordance with the timing diagram of the tabulator.

From this disclosure of the objects of the invention, it may immediately be seen that the electrical flexible connections, which replace the mechanical connections of the standard rigid wire connection box, connect the contacts controlled by the needles with any desired circuit, so that a needle by traversing a sensed card initiates the following cycle of operations:

Energizing of a predetermined circuit.

Unlatching of the related mechanical means.

Control of the stop and of the sector which, as a final result, may be considered as made to correspond to the needle under consideration.

The improved connection box which forms the object thereof in particular procures the following favourable technical results:

1. Any perforation of a card may be connected without restriction or reservation of any kind with any stop and therefore may control any sector of the tabulator. In other words, it is possible to achieve the most complicated crossed connections whatever their number.

2. A single needle or a single perforation may control any number of stops whatever their position may be.

3. Changes in connections for passing from one type of work to another may be made by the operator of the tabulator himself without the help of a specialised worker.

4. The flexible connection box according to the invention may be substituted for a rigid wire connection box and vice versa inasmuch as it required no alteration in the cycles or operating times of the tabulators and it may be rapidly adapted to the latter in situ.

Further objects of this invention will be disclosed in the following description of examples of embodiment of flexible connection boxes which simultaneously incorporate all the above defined features.

These boxes are illustrated in the following drawings wherein:

Fig 3 shows one embodiment of the box in general view taken from rear with partial sections.

Fig. 4 is a general diagram showing an alternative embodiment of the box according to the invention.

Fig. 5 is a side-view in vertical section of a box corresponding to the diagram illustrated in Fig. 4.

Fig. 6 illustrates, at a larger scale and partly in vertical section, the mechanical connections between the needle of the pin-box and the movable contacts controlled thereby.

Fig. 7 illustrates, at a larger scale and partly in vertical section, an alternative embodiment of the mechanical connections shown in Fig. 6.

Fig. 8 is a side view in vertical section of the slide-block unit included in the box represented in Fig. 2.

Fig. 9 is a plan view of Fig. 8.

Fig. 10 illustrates, at a larger scale and in side elevation, an electromagnet according to the invention.

Fig. 11 is an elevational rear view, partly in vertical section, of a pair of conjugated magnets.

Fig. 12 is an elevational side view of a flange for supporting the magnets.

Fig. 13 is a plan view of the flange shown in Fig. 12.

Fig. 14 is a side view in vertical section along line XIV—XIV of Fig. 15.

Fig. 15 is a rear view of the movable panel, the connections and the cover being omitted.

Fig. 16 is an elevational view of a contact-knife.

Fig. 17 is a plan view of the contact-knife illustrated in Fig. 16.

Fig. 18 is a side-view of a stamped cable eye to be mounted on flexible wires.

Fig. 19 is a plan view of the cable eye illustrated in Fig. 18.

Fig. 20 is an end view of the cable eye illustrated in Fig. 18.

Fig. 21 is a rear view of the mechanical controlling unit.

Fig. 22 is a side-view of the mechanical controlling unit shown in Fig. 21.

As indicated above, the essential object of this invention consists in controlling the stops forming the stop-basket of the tabulator and provided for operating the sectors thereof by means of a flexible connection box, specially equipped for performing a work different from the normal work of the tabulator and which has been predetermined according to one of the different works which may be performed by said tabulator, said box being inserted between said stop-basket and the pin-box of the tabulator, in place of the standard connection box, and acting by means of electrically controlled mechanical means, the energization of which occurs during the lifting of the needles forming the pin-box, when said needles encounter a perforation in the card to be sensed. In the contemplated form of embodiment, such means comprise as many electrical circuits as there are needles or stops and each of such circuits may energize a magnet, the movable armature of which is operative to enable the raising of the related stop, electrical flexible connections allowing to connect any individual needles, or more accurately the contacts controlled thereby, to any individual magnet.

Figure 1:
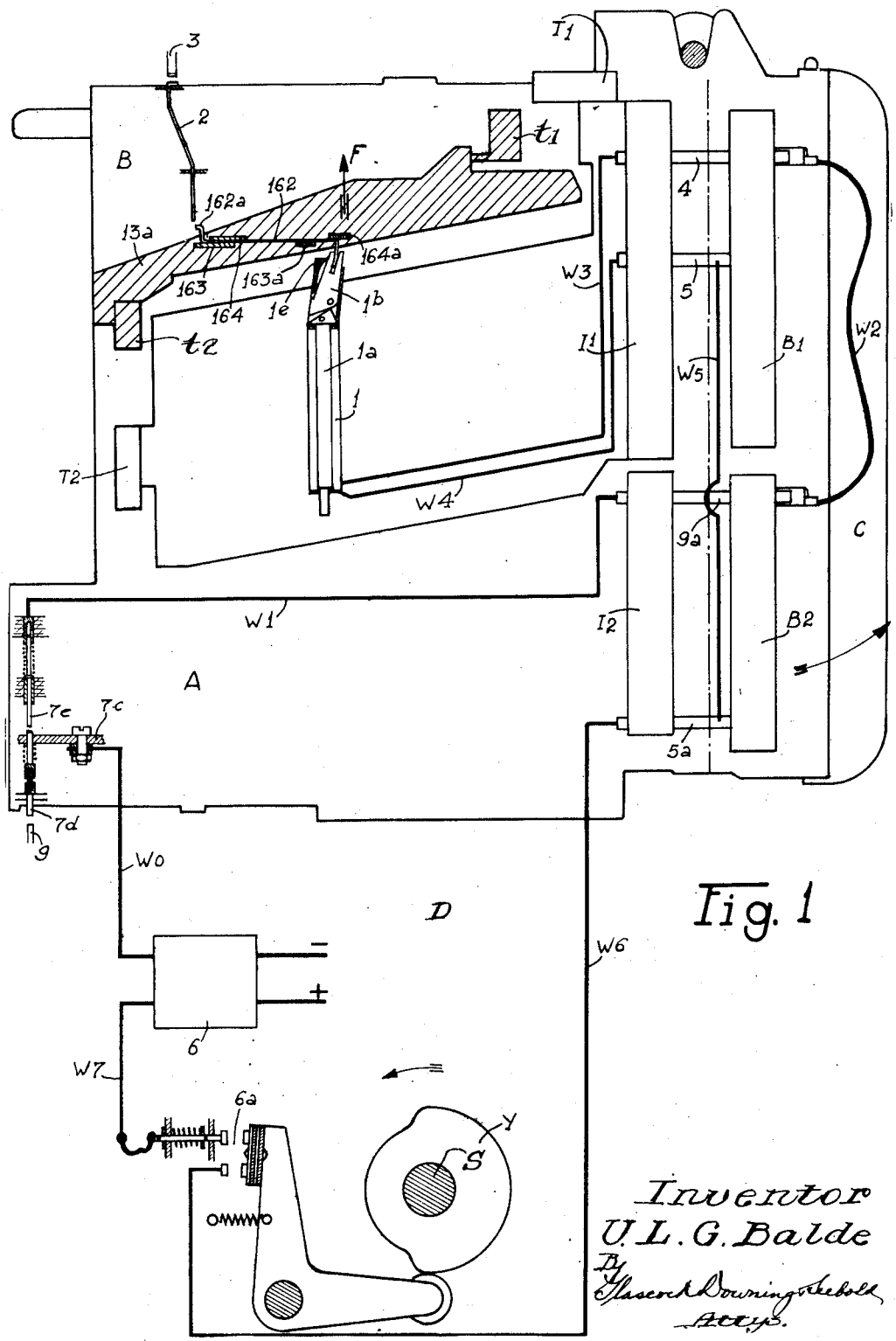
Fig. 1 is a general diagram showing the chief units or "blocks" which make up the box.

The totality of the devices forming the flexible connection box according to this invention comprises four groups or units which are indicated on the general diagram shown in Fig. 1:

A is the unit of contacts actuated by the needles including a fixed board carrying the fixed part of the electrical connections for supplying said contacts.

B is the unit for controlling the stops which in particular includes the fixed set of magnets, the movable set of slide-blocks controlled by the magnets, the fixed set of push-rods controlled by the movable slide-blocks for actuating the stops of the tabulator and a fixed board carrying the fixed part of the electrical connections for energizing the magnets.

C is the flexible connection board comprising a movable panel carrying the electrical flexible connections.

D is a switch board controlling the energization of the magnets after the circuits thereof have been conditioned by the closure of the needle contacts.

Figure 2:
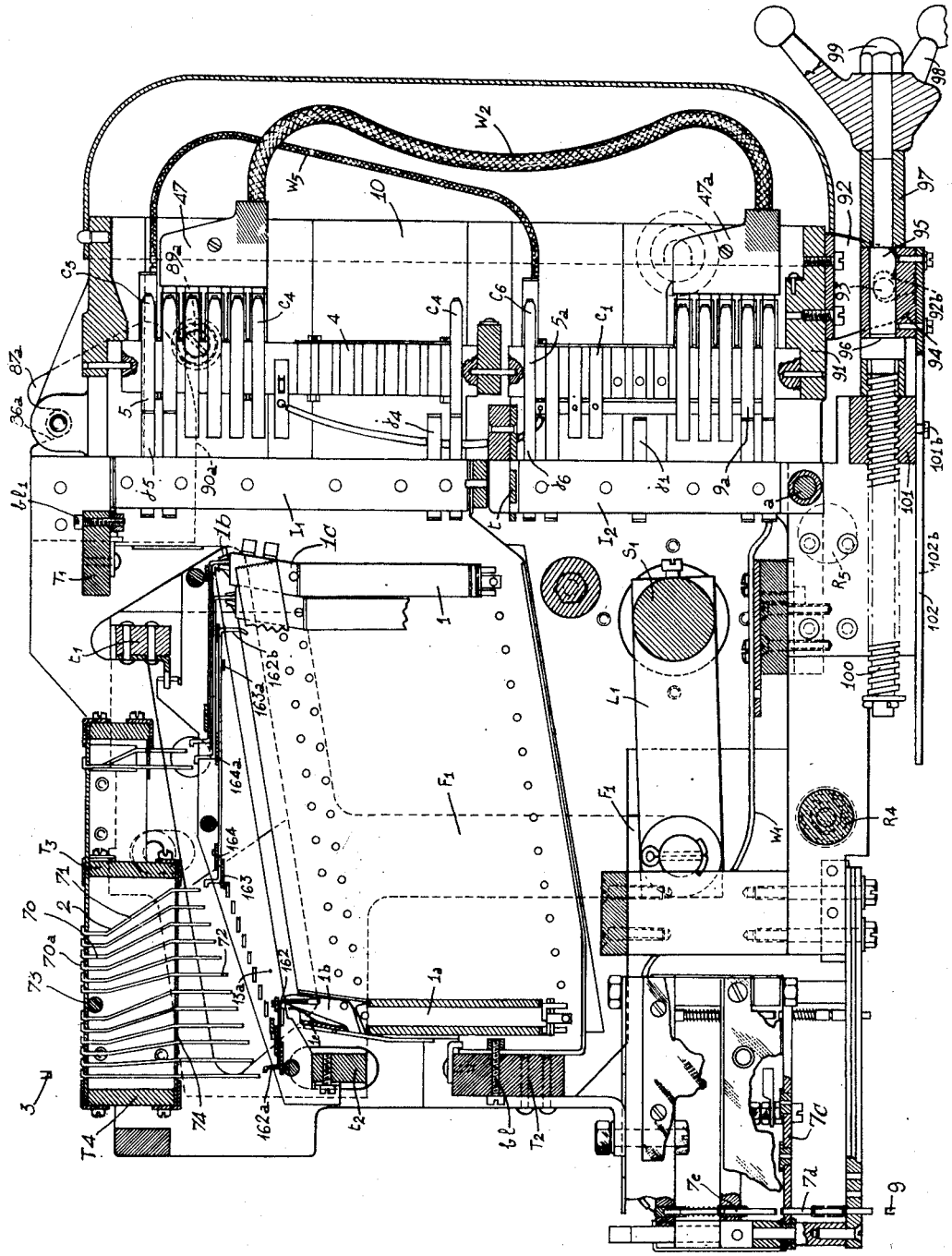
Fig. 2 is a general side view in vertical section on line II—II of Fig. 3.

Referring to Figs. 1 and 2, it will be seen that the coil of a magnet 1 corresponding to a push-rod of a stop 2 and to a stop 3 located within the stop-basket, is permanently connected on one hand to a jack 4 and on the other hand to a common 5—5a or to ground. The positive pole of a source of current, not illustrated, is connected to common 5a, through an automatic cutout 6, a line w7, a mechanically controlled switch 6a, and a line w6.

The negative pole is connected to a series of fixed connecting plates 7c which may if desired be formed by a common bar or conductor insulated from ground and which is connected, as will be explained hereinafter, to a push-rod needle 7d which may be raised by a predetermined needle 9 of the pin-box. The upward movement of the needle 9, through the corresponding hole of the card sensed, conditions the energization of the corresponding magnet 1 by closure of the contact between the push rod needle 7d and the lifter 7e. The lifter 7e is connected by the line w1 to a registering jack 9a. A flexible conductor w2 allows to connect any registering jack 9a, that is any lifter 7e, to any transferring jack 4 and consequently to any magnet 1 through line w3 so as to actuate, when the contact 7d—7e is closed as well as the switches provided on the switch board D, the push-rod 2 and the stop 3 which correspond to the considered magnet. The connection between a registering jack 9a and a transferring jack 4 is established according to the predetermined work which is to be performed by the tabulator.

The push-rods 2 of stops 3 are rectilineally guided. They are raised as the projection 162a of a slide-block 162 comes into axial alignment with the push-rod 2 when it is to be made operative. All the slide-blocks 162 are guided so as to undergo substantially horizontal displacements between transverse plates 163—163a and 164—164a carried by a member 13a, said member being subjected to vertical displacements.

Each slide-block 162 is brought to active position as the control magnet 1 therefor is energized. Each magnet 1 acts upon the related slide-block 162 through a lever 1b. If space permits, push-rods 2 may be omitted and stops 3 may be made to be directly actuated by projections 162a.

After the sensing of a card, each slide-block 162 which was in operative position is returned to its initial position by means of a spring 1e, carried by the magnet 1, acting on lever 1b.

At rest, the electrical circuit is open and a cam Y keyed on the main shaft S of the tabulator maintains the slide-block movable unit to the lower dead center. A card being in sensing position in the tabulator, the tabulator pin-box provided with needles 9 is vertically raised. The needles 9 which encounter perforations on the card are raised to the greatest possible extent, while the others are retained. Each of the needles raised to the limit acts to raise the push-rod needle 7d which pushes the lifter 7e. At that instant, the cam Y closes the mechanically controlled switch 6a and an impulse is sent to the control magnet 1 through a circuit traceable from positive pole of the current source through contacts of the mechanically controlled switch 6a, wire w6, common 5a, wire w5, common 5, wire w4, winding of the magnet 1, wire w3, transferring jack 4, wire w2, registering jack 9a, wire w1, lifter 7e, push-rod needle 7d, common plate 7c, wire w0, to negative pole of the current source.

When the magnet 1 is energized, the movable armature or lever 1b attracted by the core 1a pivots to the left and pushes the slide-block 162, the projection of which 162a comes below the push-rod 2. At that instant the cam operates the roller of the rocker arm H (Fig. 22) controlling the slide-block movable unit 13a as indicated hereinafter. The slide-block 162 when raising, according to arrow F, controls the push-rod 2 which raises the stop 3 of the tabulator stop-basket. Then, the slide-block movable unit 13a moves downward. At that instant, the needle 9 descends to the lower dead center, conditioning by the opening of the contact 7d—7e the opening of the above circuit. The magnet 1 is deenergized and the slide-block 162 is displaced at the right by means of the lever 1b controlled by the spring 1e.

As illustrated in Figs. 4 and 5 the reciprocating movement of the slide-block 162 may be controlled by a retractor 44 actuated by magnets 165 and 166. In said embodiment, the contact unit, the slide-block movable unit and the movable panel act as in the embodiment shown in Figs. 1 and 2. They differ only by the means controlling the return movement of the slide-block.

When the magnet 165 is energized, it acts through its movable armature on lever 167 pivoted on 168 so as to place the retractor 44 in position for releasing the slide-block 162. In such a position the fingers 169 of retractor 44 are positioned beyond the extension of the axis of push-rods 2. When magnet 166 is energized the plates 170 act to return the retractor 44 to the position of the drawing, the slide-blocks 162 then being retracted by the fingers 169. Current is supplied to the energizing circuits for magnets 165, 166 as well as for magnet 1 under the control of the device referred to as a whole at 6b in Fig. 4.

The two control magnets 165 and 166 have their windings connected to the common terminal 171 connected, for example, to the plus side of a source W. Said windings are on the other hand respectively connected to distinct terminals 172 and 173.

A slide-block 174 is reciprocable from the main shaft of the tabulator by a lever 193 controlled by a cam Yb keyed on said main shaft. The fixed connected plates 7c are connected to terminal 176.

Operation of the device is as follows:

As soon as the slide-block 174 starts to rise, the circuit for magnet 166 (source W, terminal 171, wire w8, coil of magnet 166, wire w9, terminal 172, rest contact 177b, operative contact 177, terminal 171a, source W), is broken at contact 177 and the circuit for magnet 165 is closed at contact 177a. Said circuit is traceable from source W through terminal 171, wire w8, coil of magnet 165, wire w10, terminal 173, rest contact 177a, operative contact 177, terminal 171a, to source W. Retractors 44 move towards the left thus leaving a clear path for the slide-blocks 162. The slide-block 174 continuing its upward motion, closes the contact 178 which causes energization of the magnets 1 through a circuit traceable from source W through terminal 171a, common 5a, common 5, coil of magnet 1, transferring jack 4, registering jack 9a, lifter 7e, push-rod needle 7d, fixed connecting plate 7c, terminal 176, slide-block 174, contacts 178, slide-block 174, terminal 171, to source W. Said energization causes displacement of the related push-rod 162. Towards the end of its upward stroke, slide-block 174 closes contact 179, this having for effect to energize magnet 180 through a circuit traceable from source W through terminal 171, contact 179, magnet 180, terminal 171a, to source W. The movable armature 181 of said magnet 180 is attracted and unlatches the member 182 which carries the conductive bridges for interconnecting contacts 178. Said member 182 urged back by spring 183 breaks contact 178. Magnets 1 are deenergized.

In its downward stroke, slide-block 174 first breaks the contact 179 to deenergize magnet 180, then breaks the contact at 177a and makes at 177. Magnet 166 is energized and retractors 44 return slide-blocks 162 to their initial position. Member 182 is returned to latched position by a kinematic connection, provided by means of a suitable cam Yc, for example, with the main shaft of the tabulator.

*Contact unit (A)*

The embodiment illustrated on Fig. 6 relates to the contact unit (A in Fig. 1) of a flexible connection box provided for a tabulator using cards having a large spacing between holes, so that the distance between two successive sets of contacts may be choiced equal to the distance between two adjacent needles of the tabulator pin-box.

The needle 9 when raised engages a push-rod 14a connected by means of an insulating member 14b to the push-rod needle 7d slidable through a hole provided in the fixed connecting plate 7c connected to the electrical common of the box. A spring 7b located round the push-rod needle 7d and abutting against a shoulder 7i provided on said push-rod needle and against the fixed connecting plate 7c ensures the electrical connection between 7d and 7c. The push-rod needle 7d carries at its upper end a silver or tungsten contact.

Facing each push-rod needle a lifter 7e is slidably mounted within two metallic bushings 7f and 7g fixedly mounted on two moulded insulating plates 18 and 18a. A spring 7h located round said lifter 7e abuts against the lower end of bushing 7g and against a shoulder 7j carried by the lifter 7e. Simultaneously, said spring ensures electrical connection between lifter 7e and bushing 7g connected to registering jack 9a. There are as many bushings 7g as possible perforations may be provided on the card. The lifter 7e carries at its lower end a silver or tungsten contact.

When a needle 9 corresponding to a perforation of the card to be sensed is upwardly moved, it raises the push-rod needle 7d located above it which, in turn, lifts the lifter 7e, springs 7b and 7h are compressed and the current flows through a circuit traceable from common through fixed connecting plate 7c, spring 7b, contact of push-rod needle 7d, contact of lifter 7e, shoulder 7j, spring 7h, bushing 7g, registering jack 9a, transferring jack 4, magnet 1, to common 5.

According to the above embodiment, the contact 7d—7e may be closed as soon as the upward motion of the needle 9 starts. The end of the stroke of said needle, mechanically controlled by the tabulator devices, is absorbed by the compression of the spring 7h on which bear 7d and 7e.

In the event of cards provided with a relatively small spacing of the perforations, the spacing between the bushings must be generally provided with a greater value than the value of the spacing existing between the needles of the tabulator pin-box. The embodiment illustrated in Fig. 7 corresponds to said requirement.

Each needle 9b of the pin-box of the tabulator is arranged in axial alignment with a push-rod 14c which reinforces the end of a steel wire 12 and which is guided in a pair of plates 15 of the general frame of the box. Each of the wires 12 engages at its upper end the shank of a plunger piston 16 movably mounted in the bore of a bushing or cylinder 17 vertically guided in an insulating plate 18b and a plate 19. In order to prevent wire 12 from buckling, the latter is engaged in a sheath 20 of the "Bowden" type for example, maintained at its lower end in a plate 21 and at its upper end in an eyelet 22 secured by a nut 23 to a plate 24. Wire 12 may be secured to the shank 16a of the plunger 16, as shown, by engaging the end of the wire in an axial aperture of said shank diametrically slotted so as to be deformable and locked on the wire by a nut 25.

In its lowermost position, bushing 17 is supported by the upper surface of the plate 18b through a base 17a. It is provided with a head 26 of insulating material, secured by screwing for example, a spring 27 being held in tension between said head and said plunger 16. The head 26 is axially provided with a tapped opening adapted to receive a screw the head of which is formed with a smooth flange or collar 28 forming a pivot for a conducting platelet 8 constituting a push switch 2 point make and carrying contacts 8a and 8c. Switch 8 has with respect to the flange 28 and the screw 29 a certain amount of freedom which allows the push produced by the upward movement of the platelet 16 may be balanced between contacts 8a and 8c. So as to positively determine the angular position of the switch and avoid an accidental contact thereof with the adjacent switches, there may be provided a pair of lugs 8b bent back to form a U the arms of which surround a foot 30 secured in the insulation plate 18b.

Contacts 8a, 8c come respectively into engagement with fixed contact pieces 7l, 7m, one of which (7l) is permanently connected to a fixed connecting plate 7n which is electrically connected to one of the poles of a source of current, as in the case for the fixed connecting plate 7c shown in Fig. 1. The other contact piece 7m, insulated from said plate 7n by means of insulating bushing 7p is connected by an individual wire, not illustrated, to a registering jack similar to the registering jack 9a shown in Fig. 1.

The shanks 16a of the plungers 16 extend through the perforations of a foot plate 32 which forms a retractor kinematically connected to the tabulator main shaft for receiving a reciprocating vertical displacement so as to return the plungers 16, after a card has been sensed, to their lowermost position by exerting pressure on nuts 25. As shown in Fig. 7, the retractor 32 which is vertically guided by brackets 33 is coupled by means of springs 35 to control bars 36 controlled by a cam Ya keyed on tabulator main shaft S.

When a push-rod 14c is lifted by the raising of the corresponding needle 9b, wire 12 lifts plunger 16 and bushing 17 as an integral whole so as to close contacts 8a, 8c—7l, 7m. Spring 21, the initial loading of which is predetermined, accordingly acts to ensure and maintain the contacts in a positive manner. The bundle of wires 12 has been caused to diverge from the push-rods 14c, the spacing between which is equal to that between the needles 9b.

Furthermore, if the tabulator, as may be the case in certain out-of-date types, is provided with a pin-box the needles of which are actuated by means of springs, then the springs 27 may be omitted and the bushings 17 and plungers 16 may be replaced by a single element. The return spring for the needle is then substituted for the spring 27 and becomes compressed at the end of the stroke, after closure of contacts 8a, 8c—7l, 7m. Such modified embodiments are obviously included within the scope of the invention.

As illustrated in Figs. 1 and 2, a fixed insulating member I2, pertaining to the contact unit A, is provided for receiving all the wires w1 and w5. Said insulating member carries jaws j1 and j6, pertaining respectively to jacks 9a and 5a, the description of which will be made hereinafter. The registering jaws j1 are in number corresponding to the number of perforations which may be provided on the cards and arranged in columns similar to the column arrangement of said perforations. Common jaws j6 are located at each end of the unit of jaws j1.

The insulating member I2 is secured, on one hand, to an axle a and, on the other hand, to a cross-bar t, said axle and said cross-bar being fixedly mounted on the fixed frame of the box.

*Control unit for the stops (B)*

Referring to Figs. 2, 3, 8 and 9, each stop push-rod 2 is actuated by a slide-block 162 of non-magnetic metal which is freely slidable between a pair of front transverse plates 163 and 164 and a pair of rear transverse plates 163a, 164a. A set of slide-blocks s1 comprises fourteen superposed slide-blocks 162 and corresponds to two rows of stops located in the tabulator stop-basket, each row comprising seven stops and corresponding to one sector of the tabulator. Said sets s1 to s5, as illustrated in upper left part of Fig. 3, are grouped in blocks, such as Ba, each block comprising five sets of slide-blocks. The transverse plates 163, 164, 163a and 164a are fixedly mounted on two flanges 13a (Fig. 9). The blocks of five sets, ten in number as illustrated in Ba to Bj on the upper part of Fig. 3 are carried by two cross-bars t1 and t2 mounted on two flanges F1 and F2 upwardly reciprocated by the cam Y keyed on the tabulator main shaft S (Fig. 22).

The stroke of a slide-block 162 is limited by two fingers 160a, 160b carried by the transverse plates 163 and 163a and engaging two slots 161a, 161b provided on the horizontal part of said slide-block (Figs. 8 and 9).

The front portion of a slide-block 162 is provided with a vertical and a horizontal bent forming an upward projection 162a. The rear portion of said slide-block is provided with a vertical bent to form a downward projection 162b.

The magnet 1 controlling the horizontal displacement of the slide-block 162 comprises a fixed armature 1a and a movable armature 1b pivotally mounted about an axle 1d crossing a tubular yoke 1c of non-magnetic metal and rectangular in cross-section. A spring 1e acts to maintain the movable armature 1b at rest, i. e. to maintain an air-gap between 1a and 1b (Figs. 10 and 11).

The upper part of the movable armature 1b is provided with a slit 1f engaging the rear downward projection 162b of the slide-block 162, the height of which is such that it is always engaged in said slit 1f, even when the slide-block unit is at the upper dead center.

At rest, the movable armature being maintained to the right by spring 1e, slide-block 162 is maintained by its downward projection 162b engaged in said movable armature.

If an impulse energizes the magnet 1, the fixed armature 1a attracts the movable armature 1b which pivots about axle 1d while overcoming the pressure exerted by spring 1e. When pivoting the movable armature 1b moves the slide-block 162 to the left and maintains said slide-block in said position during energization of magnet 1. In that position the upward projection 162a is located opposite the corresponding push-rod 2.

If at that instant flanges F1 and F2 are raised, the front projection 162a of slide-block 162 lifts the corresponding push-rod 2 and stop 3 in tabulator pin-basket. When flanges F1 and F2 are raised, the slide-blocks, the controlling magnets of which are not energized, are maintained in their rest positions and pass sideways the corresponding push-rods 2 which thus are not operated no more than the corresponding stops 3.

When the magnet 1 is deenergized, movable armature 1b being no longer attracted by fixed armature 1a is pushed to the right by spring 1e bringing back slide-block 162 at rest.

The sets of fourteen magnets, each corresponding to a set of fourteen slide-blocks relating to two sectors of the tabulator, are mounted two by two on both sides of flanges 63 of non-magnetic metal (Figs. 12 and 13). Each flange 63 carries the magnets corresponding to four sectors of the tabulator.

The flanges 63 are fixedly mounted on two cross-bars T1 and T2 by means of bolts such as ba, bb . . . bw for cross-bar T2 and ba1, bb1 . . . for cross-bar T1 (Fig. 3), said cross-bars being carried by the fixed frame of the flexible connection box.

For dismounting flanges 63, bolts such as b1 and b11 are respectively unscrewed on cross-bars T2 and T1. The unit of flanges 63 is lowered while the slide-block unit is raised by action of flanges F1 and F2 in order to disengage bent portions 162b from magnet slits 1f. At that instant the required flange or flanges 63 may be extracted from the flange unit.

At the rear end of flange 63 are mounted insulating members I1 (Figs. 1, 2, 12 and 13) carrying jaws j4 of transferring jacks 4. For each flange there are fifteen jaws, one jaw j4 for each magnet and one common jaw j5 connected to the bringing out of the ends of each magnet.

The push-rods 2 are cambered or deformed in such a way that their heads are located in alignment with the stops 3 and adjacent from others while their feet are located in alignment with the slide-block bents 162a when operative and remote to provide the necessary spacing for the vertical displacements of said bents 162a. As illustrated in Fig. 2 each push-rod 2 comprises a vertical head 70 provided with a horizontally bent portion 70a, a body 71 which is cambered in accordance with the position of the push-rod and a vertical foot 72. The unit of push-rods 2 cross slots provided on an upper plate 73 on which bear their heads at rest and on lower plate 74, said plates carried by cross-bars T3 and T4 mounted on the box frame act as guiding means for allowing the vertical displacement of the push-rods.

The embodiment shown in Figs. 4 and 5 differs from the above described embodiment only by the fact that the spring 1e is omitted and replaced by the retractor 44, the working of which was aforesaid disclosed.

Flexible connection board (C)

As may be more particularly seen in Figs. 14 and 15 the connections between magnets 1 and lifters 7e controlled by the needles of the tabulator pin-box are effected by means of a board which comprises a movable panel 10 of insulating material provided vertically at the rear of the flexible connection box throughout the entire width of which it is in principle made to extend.

Said movable panel 10 comprises a metallic frame 91 the upper part of which carries two axles 85a and 85b acting as journals and secured on said part by screwing. Said axles 85a and 85b engage recesses or castellations 86a and 86b formed in yokes adapted or suitably secured to the upper ends of two flanges 87a and 87b which in turn are fixed to the upper part of the rear frame of the machine (Figs. 2 and 3).

The movable panel 10 may in this way be subjected to angular displacements about the common theoretical axis of the axles 85a and 85b. Said axles are normally maintained in engagement with the recesses 86a and 86b by the engagement of two rollers 89a and 89b, rotatably mounted on fixed trunnions carried by the movable panel frame 91, with sectors 90a and 90b arcuated concentrically with the axis of recesses 86a and 86b and forming the lower edges of the flanges 87a and 87b.

The angular amplitude of sectors 90a and 90b is predetermined so that, when giving to the movable panel 10 a sufficient inclination about axles 85a and 85b, rollers 89a and 89b are disengaged from sectors 90a and 90b allowing to disengage axles 85a, 85b from recesses 86a, 86b with a view to remove the movable panel 10.

Movable panel 10 carries, on one hand, contact knives C1 and C6 forming parts of registering jacks 9a and common jack 5a and, on the other hand, contact knives C4 and C5 forming parts of transferring jacks 4 and comon jack 5.

Contact knives C1 and C6 are located at the lower part of the movable panel. Contact knives C1 are in number corresponding to the number of perforations which may be provided on the cards and arranged similarly to said perforations. As illustrated on Fig. 15, there are ninety sets of contact knives C1, each set having six knives in accordance with the ninety columns of six holes provided on the card called "card ninety columns." Contact knives C6 are located on each end of the unit of contact knives C1.

Contact knives C4 and C5 are located at the upper part of the movable panel. Their number corresponds to the number of jaws j4 and j5 carried by the insulating member 11 at the rear part of the flanges 63.

The fixation of said various contact knives on the frame 91 is made as follows:

The upper part and the lower part of said frame 91 are provided with holes for location of vertical studs P1 and P2 projecting inwardly said frame. Similarly a horizontal cross-bar K fixedly mounted on frame 91 by means of screws K1 and K2 carries vertical studs P3 projecting on both sides of said cross-bar. Studs P1, P2 and P3 are coaxial. Platelets B1 of molded insulating material are maintained in vertical location by means of studs P2 and P3. One face of said platelets is provided with grooves e1 in order to enclose contact knives C1 and C6 between two adjacent platelets. The number of said platelets B1 corresponds to the number of the columns provided on the card plus one platelet on each side for connecting to the common. Platelets B2 similar to platelets B1 but provided with a greater number of grooves e2 are maintained in vertical location by means of studs P1 and P3 for enclosing contact knives C4 and C5.

Contact knives C4 may be electrically connected to contact knives C1 by flexible connections such as wire w2 in accordance with the desired grouping of tabulator sectors corresponding to the character of the desired work to be performed. The selection of contact knife or knives C1 to connect with a contact knife C4 may be easily modified with a view to change the prior character of said work. Contact knives C5 and C6 are permanently connected by a fixed wire w5.

Each contact knife C1, C4, C5 or C6 comprises, as illustrated in Figs. 16 and 17, a set of three conductive blades 40a, 40b and 40c, blades 40a and 40c being located on both sides of central blade 40 and assembled with said central blade by means of stamped centers 41 gripped within holes provided on blade 40b. The left portions of blades 40a and 40c are oppositely bent in order to form a flexible knife 42 which, when the movable panel is mounted on the machine, engages the corresponding jaws j1, j4, j5 or j6. The right portions 40d, 40e of blades 40a and 40c are oppositely bent also in order to form a pair of jaws 43, 43a on both sides of central blade 40b the free end of which forms a projection 45.

Within said jaws 43, 43a may be placed two special stamped cable eyes 46, as illustrated in Figs. 18 to 20. Said special stamped cable eye 46 comprises a tubular portion 46a for soldering the cable or wire, two bent edges 46b, 46c for centering said eye on bent portion 40d or 40e and a boss 46d for locating in the curved portion 40f or 40g provided on blades 40a, 40c, with a view to allow the disengagement of the cable eye 46 with the corresponding jaw 43 or 43a only when a sufficient traction is exerted on said eye for extracting the same by raising the corresponding bent portion 40d or 40e.

The special stamped cable eyes 46 may be grouped in an insulating case with a view to form a multiple-pin plug for connecting by a single operation several contact knives located in the same vertical row, as illustrated in Figs. 2 and 14 for five-pin plugs 47 and 47a. When two multiple-pin plugs are used for connecting contact-knives C1 and C4, they are connected by a single cable provided with conductors the number of which corresponds to the number of cable eyes mounted on said multiple-pin plugs.

The movable panel 10, including contact-knives, special stamped cable eyes and flexible wires, is protected by means of a cover 91b. Under its lower part, as illustrated in Figs. 14 and 15, the frame 91 carries a yoke 92 the sides of which are provided with grooves 92b for engaging a pair of opposite trunnions 93 integral with a bushing 94 (Figs. 2 and 5). In said bushing 94 may freely rotate a pin 95 axially abutted in both directions, on one hand, by a shoulder 96 provided thereon and, on the other hand, by a socket 97 on which bears a hand wheel 98 secured by screwing on the rear part of said pin and maintained by a stop nut 99. The front part of said pin 95 is provided with a screw threaded portion 100 having preferably square threads and engaging a complementary threaded hole provided in a nut 101 secured on frame 91 by means of a bolt 101b slidable in a slot 102b machined on a plate 102 carried by bushing 94. The nut 101 is rotatably mounted on two axles 101a and 101c crossing fixed frame of the machine. Pin 95, hand wheel 98 and nut 101 form a fastening unit.

In order to assemble the movable panel 10 with the machine, said panel is maintained by two handles 91c (Fig. 3). Axles 85a, 85b are engaged in yoke 86a, 86b while giving to the panel a sufficient inclination in order to avoid engagement of rollers 89a, 89b with sectors 90a, 90b. Then, by pivoting about axles 85a, 85b the panel 10 is lowered until both the trunnions 93 engage slots 92b by pivoting of the fastening device about axles 101a, 101c. Then, by rotating hand-wheel 98 for displacing threaded part 100 regarding fixed nut 101, panel 10 is placed in vertical location. A reverse operating allows to dismount the panel.

Sectors 90a, 90b act as safety devices allowing the panel 10 to be mounted on the frame of the box or dismounted therefrom only in a position wherein there is no risk of injuring the set of contact-knives C4 and C5 carried by the upper portion of panel 10.

When the movable panel 10 is assembled, the contact knives C1, C4, C5 and C6 engage respectively the jaws $j1$, $j4$, $j5$ and $j6$ carried by insulating members I1 and I2.

*Mechanical controlling means*

As above indicated the slide-blocks 162, grouped in sets of five rows, are carried by cross-bars $t1$ and $t2$, which may be vertically moved. Said vertical movement is mechanically controlled by the tabulator main shaft S as follows:

The cross-bars $t1$ and $t2$ are carried by two flanges F1 and F2 guided at their upper part by two rollers R1 and R2 pivotally mounted on pins supported by the frame of the box (Fig. 3). Flanges F1 and F2 are provided at their lower part with axles A1, A2 journalling within two levers L1, L2 keyed on a shaft S1 crossing the frame of the box (Figs. 3, 21 and 22). At one projection of said shaft S1 outside of said frame is keyed a lever L3 on which is pivotally mounted a roller R3. All these devices form the mechanical transferring unit of the box.

When a flexible connection box according to the invention is to be used in connection with a tabulator, two girders G1, G2 are fixed on the frame of said tabulator, illustrated in dotted lines, by means of a supporting structure S2, as illustrated in Figs. 21 and 22, so that their upper face coincides with the upper face of the support carrying the standard connection box of the tabulator equipped with rigid wires or "Bowden." In this way, the standard connection box may be extracted from the tabulator and the improved flexible connection box, equipped for a work different from the work normally performed by said tabulator, may be put in the place of said standard box by means of two front rollers R4 and two rear rollers R5 (Fig. 2) carried by the lower part of its frame and rolling on girders G1 and G2. Further, the standard connection box, when dismounted and replaced by an improved flexible connection box, may be temporarily placed on said girders in order to allow an eventual use for the normal work performed originally by the tabulator.

The supporting structure S2 carries a bridge B3 through which is slidably mounted an adjustable twin-part lever $l$ provided at its upper end and perpendicularly to its longitudinal axis with a recess $r$. The lower end of said adjustable lever $l$ is articulated on one end of a rocker H pivoting about a pin P4 carried by the frame of the tabulator. The other end of rocker H carries a roller R3 engaging a hollow cam $Yd$ keyed on the tabulator main shaft S.

When the improved flexible connection box is inserted in the tabulator to be put in operative position, the roller R3 is engaged in the recess $r$, after the adjustable twin-part lever $l$ has been adjusted.

Thus, by the combination of the above described devices and by an appropriate shaping of the driving groove provided on the hollow cam $Yd$ slide-blocks 162 may be continuously and mechanically controlled, i. e. accurate raising and lowering for the stops to be actuated in the stop-basket of the tabulator in accordance with the timing diagram of said tabulator.

The springs X shown in Fig. 3 are used for balancing the weights of sets of stops, cross-bars $t1$ and $t2$, flanges F1 and F2, axles A1 and A2 and levers L1 and L2.

What I claim as my invention and desire to secure by Letters Patent is:

1. In a connecting assembly for perforated card recording machines of the type called tabulator, which is to be inserted between the needles of the pin-box and the stops of the stop-basket of said tabulator, in place of the standard rigid wire connection box controlled by the main shaft thereof, for performing a recording work the character of which is different from the character of the normal recording work performed through said standard connection box, in combination, a reciprocable unit having operable mechanical means the number of which is equal to the number of the stops, each of them for actuating the corresponding stop when set in operative position, electrical means for setting in operative position those of said mechanical means whereof the operative relations with needles passing through the perforations of a card have been previously determined according to the work to be performed, said electrical means comprising a detachable unit having electrical circuit elements previously erected according to said work, and a cam means keyed on the main shaft for reciprocating said reciprocable unit, whereby said mechanical means electrically set in operative position actuate the corresponding stops.

2. In a connecting assembly for perforated card recording machines of the type called tabulator, which is to be inserted between the needles of the pin-box and the stops of the stop-basket of said tabulator, in place of the standard rigid wire connection box controlled by the main shaft thereof, for performing a recording work the character of which is different from the character of the normal recording work performed through said standard connection box, in combination, a reciprocable unit having operable mechanical means the number of which is equal to the number of the stops each of them for actuating the corresponding stop when set in operative position, electro-magnets the number of which is equal to that of said mechanical means each of them when energized for setting in operative position the corresponding mechanical means, contacts the number of which is equal to that of the needles each of them being adapted to be operated when the corresponding needle passes through a perforation of a card, a plurality of detachable panels each of them having electrical circuit elements previously erected according to a predetermined work to be performed by the tabulator for connecting in series each of said contacts with at least one of said electro-magnets according to said work, whereby a quick changing of the work to be performed is obtained by the replacing of the detachable panel corresponding to the previous work by the detachable panel corresponding to the new work, and a cam means keyed on the main shaft for reciprocating said reciprocable unit.

3. In a connecting assembly for perforated card recording machines of the type called tabulator, which is to be inserted between the needles of the pin-box and the stops of the stop-basket of said tabulator in place of the standard rigid wire connection box controlled by the main shaft thereof, for performing a recording work the character of which is different from the character of the normal recording work performed through said standard connection box, in combination, a unit independent from the tabulator comprising a plurality of movable contacts the number of which is equal to the number of the needles, means for operating each of said contacts when the corresponding needle passes through a perforation of the card, a reciprocable block carrying a plurality of operable mechanical devices the number of which is equal to the number of the stops, each of said devices being adapted to control one of said stops when set in operative position, a plurality of fixed electro-magnets the number of which is equal to the number of said mechanical devices, each of them when energized being adapted to set in operative position the corresponding mechanical device and a mechanical means for reciprocating said block, a plurality of detachable panels each of them having electrical circuit elements previously erected according to a predetermined work to be performed by the tabulator for connecting in series each of said contacts with at least one of said electro-magnets according to said work, whereby a quick changing of the work to be performed is obtained by the replacing of the detachable panels corresponding to the previous work by the detachable panel corresponding to the new work, means for inserting said independent unit between the pin-box and the stop-basket of the tabulator, a cam means keyed on the main shaft of said tabulator for operating said reciprocating means according to the timing diagram of said tabulator and a mechanical connection between said cam means and said reciprocating means.

4. In a connecting assembly for perforated card recording machines of the type called tabulator, which is to be inserted between the needles of the pin-box and the stops of the stop-basket of said tabulator, in place of the standard rigid wire connection box controlled by the main shaft thereof, for performing a recording work the character of which is different from the character of the normal recording work performed through said standard connection box, in combination, a unit independent from the tabulator comprising a plurality of movable contacts the number of which is equal to the number of the needles, means for operating each of said contacts when the corresponding needle passes through a perforation of the card, a reciprocable block carrying a plurality of operable mechanical devices the number of which is equal to the number of the stops, each of said devices being adapted to control one of said stops when set in operative position, a plurality of fixed electro-magnets the number of which is equal to the number of said mechanical devices, each of them when energized being adapted to set in operative position the corresponding mechanical device, a source of current connected at one end to said contacts, fixed registering circuit elements connected respectively with each of said contacts, and with said source, fixed transferring circuit elements connected respectively with each of said electro-magnets, and a mechanical means for reciprocating said block, a plurality of detachable panels each of them having electrical circuit elements previously erected according to a predetermined work to be performed by the tabulator for connecting in series each of said registering circuit elements with at least one of said transferring circuit elements according to said work, whereby a quick changing of the work to be performed is obtained by the replacing of the detachable panel corresponding to the previous work by the detachable panel corresponding to the new work, means for inserting said independent unit between the pin-box and the stop-basket of the tabulator, a cam means keyed on the main shaft of the said tabulator for operating said reciprocating means according to the timing diagram of said tabulator and a mechanical connection between said cam means and said reciprocating means.

5. A connecting assembly, according to claim 4, wherein each electrical circuit formed by fixed and detachable circuit elements comprises in series a registering fixed wire connected to one of said contacts, a fixed registering jaw, a movable registering contact knife, a movable flexible wire, a movable transferring contact knife, a fixed transferring jaw, winding of an electro-magnet, a fixed transferring common jaw, a movable transferring common contact knife, a fixed flexible wire, a movable leading-out contact knife, a fixed leading-out jaw and a leading-out wire connected to said source of current, and wherein the movable panel is a twin-part panel the upper part of which carries said movable transferring contact knives and said movable transferring common contact knives and the lower part of which carries said movable registering and leading out contact knives.

6. A connecting assembly, according to claim 4, wherein the electrical circuits formed by fixed and detachable circuit elements comprise electrical single circuits each having in series a registering fixed wire connected to one of said contacts, a fixed registering jaw, a movable registering contact knife, a movable flexible wire, a movable transferring contact knife, a fixed transferring jaw, winding of an electro-magnet, a fixed transferring common jaw, a movable transferring common contact knife, a fixed flexible wire, a movable leading-out contact knife, a fixed leading-out jaw and a leading-out wire and electrical multiple circuits similar to said single circuits wherein a plurality of movable flexible wires connect one movable registering contact knife to several movable transferring contact knives the number of which is equal to the number of movable flexible wires forming said plurality, and wherein the movable panel is a twin-part panel the upper part of which carries said movable transferring contact knives and said movable transferring common contact knives and the lower part of which carries said movable registering and leading-out contact knives.

7. A connecting assembly, according to claim 4, wherein the movable contacts and the means for operating the same comprise, for each contact, a push rod needle adapted to be upwardly moved by the corresponding needle of the pin-box, means for electrically connecting said push-rod needle to the source of current and a lifter located distant from said push rod needle at rest, connected to the fixed registering part of the corresponding electrical circuit and adapted to be upwardly moved by said push rod needle.

8. A connecting assembly, according to claim 4, wherein the reciprocating means comprises a vertically movable unit having push-rods the number of which is equal to that of the stops for raising said stops and slide-blocks adapted to be horizontally moved between a rest position and an operative position wherein they control said push-rods when said unit is lifted, means for latching said slide-blocks at rest, means for freeing the latching means of a slide-block and for moving said slide-block from its rest position to its operative position when the corresponding magnet is energized and means for controlling said vertically movable unit by said cam.

9. A connecting assembly, according to claim 4, wherein the reciprocating means comprises a vertically movable unit having push-rods the number of which is equal to that of the stops for raising said stops and slide-blocks provided with a downward vertical bent adapted to be horizontally moved between a rest position and an operative position wherein they control said push-rods when said unit is lifted, for each slide-block, a lever provided with an upper slit for engaging said downward vertical bent articulated on the corresponding electromagnet and adapted to move said slide-block to its operative position when said magnet is energized, a spring mounted on said electro-magnet for maintaining said lever at rest when not energized and for bringing back said lever at rest when deenergized and means for controlling said vertically movable unit by said cam.

10. A connecting assembly, according to claim 4, wherein the mechanical devices for controlling the stops and the mechanical connection between said mechanical devices and the main shaft comprise a cam keyed on said main shaft, a vertically movable unit having push-rods the number of which is equal to that of the stops for raising said stops and slide-blocks provided with a downward vertical bent adapted to be horizontally moved between a rest position and an operative position wherein they control said push-rods when said unit is lifted, for each slide-block, a lever provided with an upper slit for engaging said downward vertical bent articulated on the corresponding electromagnet and adapted to move said slide-block to its operative position when said magnet is energized, a retractor for maintaining said lever at rest and for bringing back the same respectively when the corresponding electromagnet is not energized and deenergized, two general magnets for controlling said retractors, electrical circuits for connecting said general magnets to the source of power and means for controlling said vertically movable unit by said cam.

11. A connecting assembly, according to claim 4, wherein each electrical circuit formed by fixed and detachable circuit elements comprises in series a registering fixed wire connected to one of said contacts, a fixed registering jaw, a movable registering contact knife, a movable flexible wire, a movable transferring contact knife, a fixed transferring jaw, winding of an electromagnet, a fixed transferring common jaw, a movable transferring common contact knife, a fixed flexible wire, a movable leading-out contact knife, a fixed leading-out jaw and a leading-out wire connected to said source of current, wherein the movable panel is a twin-part panel the upper part of which carries said movable transferring contact knives and said movable transferring common contact knives and the lower part of which carries said movable registering and leading-out contact knives and wherein the means for varying electrical circuits comprise, for each movable flexible wire, a pair of cable eyes respectively mounted at each end of said movable wire and adapted to be inserted respectively within the movable transferring contact knife and the movable registering contact knife corresponding to any predetermined work to be performed by the tabulator.

12. A connecting assembly, according to claim 4, wherein the electrical circuits formed by fixed and detachable circuit elements comprise electrical single circuits each having in series a registering fixed wire connected to one of said contacts, a fixed registering jaw, a movable registering contact knife, a movable flexible wire, a movable transferring contact knife, a fixed transferring jaw, winding of an electromagnet, a fixed transferring common jaw, a movable transferring common contact knife, a fixed flexible wire, a movable leading-out contact knife, a fixed leading-out jaw and a leading-out wire and electrical multiple circuits similar to said single circuits wherein a plurality of movable flexible wires connect one movable registering contact knife to several movable transferring contact knives the number of which is equal to the number of movable flexible wires forming said plurality, wherein the movable panel is a twin-part panel the upper part of which carries said movable transferring contact knives and said movable transferring common contact knives and the lower part of which carries said movable registering and leading-out contact knives and wherein the means for varying electrical circuits comprise, for each movable flexible wire pertaining to an electrical single circuit a pair of cable eyes respectively mounted at each end of said movable wire and adapted to be inserted respectively within the movable transferring contact knife and the movable registering contact knife corresponding to any predetermined work to be performed by the tabulator and, for each set of movable wires pertaining to an electrical multiple circuit, a plurality of cable eyes one of them is mounted at the common end of said set of wires for being inserted within a movable registering contact knife, the others being mounted respectively at each free end of said wires for being inserted within movable transferring contact knives, said contact knives being determined in accordance with any predetermined work to be performed by the tabulator.

13. A connecting assembly, according to claim 4, wherein the means for inserting the independent unit between the pin-box and the stop-basket of the tabulator comprise two girders fixed on said tabulator the upper faces of which coincide with the upper face of the support carrying the standard connection box, a structure for supporting said girders and two pairs of front and rear rollers carried by the lower part of said independent unit for rolling said box on said girders.

BALDÉ, ULYSSE LOUIS GABRIEL.

REFERENCES CITED

The following references are of record in the file of this patent:

UNITED STATES PATENTS

| Number | Name | Date |
|---|---|---|
| 1,333,890 | Wright | Mar. 16, 1920 |
| 1,978,919 | Tripp | Oct. 30, 1934 |
| 2,122,206 | Keefe | June 28, 1938 |
| 2,330,948 | Brand et al. | Oct. 5, 1943 |

FOREIGN PATENTS

| Number | Country | Date |
|---|---|---|
| 401,012 | Great Britain | Nov. 9, 1933 |
| 465,368 | Belgium | Nov. 20, 1946 |